US011187368B2

(12) United States Patent
Tang et al.

(10) Patent No.: US 11,187,368 B2
(45) Date of Patent: Nov. 30, 2021

(54) 6-DOF PLATFORM FOR WAVE COMPENSATION

(71) Applicant: Shanghai Maritime University, Shanghai (CN)

(72) Inventors: Gang Tang, Shanghai (CN); Chao Hu, Shanghai (CN); Xiong Hu, Shanghai (CN)

( * ) Notice: Subject to any disclaimer, the term of this patent is extended or adjusted under 35 U.S.C. 154(b) by 120 days.

(21) Appl. No.: 16/632,502

(22) PCT Filed: Mar. 12, 2018

(86) PCT No.: PCT/CN2018/078667
§ 371 (c)(1),
(2) Date: Jan. 20, 2020

(87) PCT Pub. No.: WO2019/148593
PCT Pub. Date: Aug. 8, 2019

(65) Prior Publication Data
US 2021/0164604 A1  Jun. 3, 2021

(30) Foreign Application Priority Data
Feb. 2, 2018  (CN) .......................... 201810108376.2

(51) Int. Cl.
*B63B 39/00* (2006.01)
*F16M 11/04* (2006.01)
(Continued)

(52) U.S. Cl.
CPC ......... *F16M 11/045* (2013.01); *B63B 39/005* (2013.01); *F16M 11/048* (2013.01);
(Continued)

(58) Field of Classification Search
CPC ..... B63B 39/00; B63B 39/005; F16M 11/045; F16M 11/048; F16M 11/18;
(Continued)

(56) References Cited

U.S. PATENT DOCUMENTS

2012/0048156 A1\* 3/2012 Zhang ................. F16M 11/043
108/91
2013/0220960 A1 8/2013 Bjorshol
2015/0354747 A1\* 12/2015 Jennings ................ B63B 25/28
248/396

FOREIGN PATENT DOCUMENTS

CN  104214484  4/2016
CN  106744320 A  5/2017
(Continued)

*Primary Examiner* — Jonathan Liu
*Assistant Examiner* — Thomas J. Bridges
(74) *Attorney, Agent, or Firm* — Lei Jiang, Esq.; Lei Jiang LLC (57) ABSTRACT

The present invention relates to the field of wave compensation equipment, and discloses a 6-Dof platform for wave compensation, comprising a soleplate, a 2R1T parallel unit, a 1R2T series unit and an upper platform. The soleplate is installed on a deck of a ship, the 2R1T parallel unit is installed on the soleplate, the 1R2T series unit is installed on the 2R1T parallel unit, and the upper platform is installed on the 1R2T series unit. The invention compensates 6-Dof motion of heave, roll, pitch, sway, surge and yaw of the ship under action of waves. The present invention has the advantages of simple structure, high carrying capacity, easy control and high precision in posture control.

1 Claim, 3 Drawing Sheets (51) Int. Cl.
*F16M 11/18* (2006.01)
*F16M 11/20* (2006.01)
*F16M 11/24* (2006.01)
*F16M 13/02* (2006.01)

(52) U.S. Cl.
CPC ......... *F16M 11/18* (2013.01); *F16M 11/2042* (2013.01); *F16M 11/24* (2013.01); *F16M 13/02* (2013.01)

(58) Field of Classification Search
CPC .... F16M 11/2042; F16M 11/24; F16M 11/02; F16M 11/00; F16M 11/12; F16M 11/126; F16M 11/2064; F16M 11/26
USPC .......................................................... 114/121
See application file for complete search history.

(56) References Cited

FOREIGN PATENT DOCUMENTS

| | | | |
|---|---|---|---|
| CN | 104627857 | A | 8/2017 |
| CN | 105253264 | A | 9/2017 |
| CN | 107265314 | A | 10/2017 |
| CN | 106005278 | A | 1/2018 |
| CN | 105909574 | A | 2/2018 |
| CN | 106828789 | A | 4/2018 |
| CN | 106882344 | A | 10/2018 |
| KR | 20120035432 | A | 1/2013 |
| WO | WO2015133896 | | 9/2015 |

\* cited by examiner

6-DOF PLATFORM FOR WAVE COMPENSATION

FIELD OF INVENTION

The present invention relates to the field of wave compensation equipment, and in particular to a 6-Dof (degree of freedom) platform for wave compensation.

BACKGROUND ART

Under action of waves, a ship has six degrees of freedom of motion, that is, heave, roll, pitch, sway, surge and yaw, which impact greatly on mechanical operation on the ship. Take naval offshore replenishment as an example: relative movement of two ships due to heave, roll and pitch may result in collision of the cargo being replenished with the deck of the replenished ship, resulting in big risk to the replenishment operation; while relative motion of the two ships due to surge, sway and yaw in a transverse plane makes it extremely difficult for the cargo to be accurately positioned.

The Chinese invention patent CN106744320A discloses a six degree of freedom active wave compensation hoisting. Compensation in six degrees of freedom is achieved via a servo motor driven steel wire rope towing spreader system. It has big volume and weight over prior art, in addition to increased operational difficulty due to the installation per se. The Chinese invention patent CN106828789A discloses a wave compensation device for high pile cap mounting operation. Wave compensation is realized via a hydraulic drive unit. However, it only compensates motion in three degrees of freedom: heave, roll and pitch, not capable of achieving 6-Dof compensation.

SUMMARY OF THE INVENTION

To solve the problem of 6-Dof wave compensation, it is an object of the present invention to provide a 6-Dof platform for wave compensation.

The 6-Dof platform for wave compensation comprises a soleplate, a 2R1T parallel unit, a 1R2T series unit and an upper platform. The soleplate is installed on a deck of the ship, the 2R1T parallel unit is installed on the soleplate, the 1R2T series unit is installed on the 2R1T parallel unit, and the upper platform is installed on the 1R2T series unit. The soleplate is employed to install the 2R1T parallel unit and the 1R2T series unit, the 2R1T parallel unit is employed to compensate the roll, pitch and heave motion, the 1R2T series unit is employed to compensate the yaw, sway and surge motion, and the upper platform is employed to install on-vessel equipment.

The 2R1T parallel unit comprises a longitudinal hinge, a transverse hinge, a lower guide rail fitting plate, three vertical guide rods, three vertical guide sleeves, a guide rail fitting roof, a first roof, a first electric cylinder, a second electric cylinder, a third electric cylinder, a first ball head, a second ball head, a third ball head, a first displacement sensor, a second displacement sensor, a third displacement sensor, an inner stop ring and an outer stop ring. A lower surface of the longitudinal hinge is fixed on the soleplate. A side of the transverse hinge is hinged on the longitudinal hinge, while another side of the transverse hinge is hinged on the lower guide rail fitting plate. The three vertical guide rods are arranged on an upper surface of the lower guide rail fitting plate. An end of each of the vertical guide rod is vertically fixed with the lower guide rail fitting plate, while another end of each of the vertical guide rods is assembled with one of the vertical guide sleeves respectively. The three vertical guide sleeves are installed on the guide rail fitting roof and fixed vertically with a lower surface of the guide rail fitting roof, with an upper surface of the guide rail fitting roof being fixed on a lower surface of the first roof. The first electric cylinder, the second electric cylinder and the third electric cylinder are all installed on the lower surface of the first roof and a bottom of a cylinder body of each of the first electric cylinder, of the second electric cylinder and of the third electric cylinder respectively is vertically fixed with the lower surface of the first roof and an end of a push rod of each of the first electric cylinder, of the second electric cylinder and of the third electric cylinder respectively is arranged with the first ball head, the second ball head and the third ball head correspondingly. The first ball head, the second ball head and the third ball head are all pressed against the soleplate. The first displacement sensor, the second displacement sensor and the third displacement sensor are all installed on a cylinder body of each of the first electric cylinder, of the second electric cylinder and of the third electric cylinder respectively. The inner stop ring and the outer stop ring are both fixed on an upper surface of the soleplate. The longitudinal hinge and the transverse hinge constitute a universal hinge unit. The three vertical guide rods limit transverse motion and rotation around vertical direction of the first roof. The first displacement sensor, the second displacement sensor and the third displacement sensor collect a vertical displacement of the first electric cylinder, the second electric cylinder and the third electric cylinder respectively resulting from roll, pitch, and heave motion correspondingly. The inner stop ring and the outer stop ring set a limit of motion range for the first ball head, the second ball head and the third ball head in response to compensation of roll and pitch motion respectively via the 2R1T parallel unit, ensuring that a compensation stroke of the corresponding electric cylinder is within a specified range.

The 1R2T series unit comprises two longitudinal lower tracks, a longitudinal electric cylinder, a second roof, four longitudinal upper tracks, a longitudinal push-pull board, a longitudinal displacement sensor, two first transverse lower tracks, a first transverse electric cylinder, four first transverse upper tracks, a first transverse slide, a first transverse push-pull plate, a first transverse displacement sensor, a first limit lower track, a first sliding support rod, two second transverse lower tracks, a second transverse electric cylinder, four second transverse upper tracks, a second transverse slide, a second transverse push-pull plate, a second transverse displacement sensor, a second limit lower track, a second sliding support rod, a third transverse lower track and a third transverse upper track. The two longitudinal lower tracks are longitudinally installed at a left side and a right side respectively of an upper surface of the first roof of the 2R1T parallel unit. The longitudinal electric cylinder is installed longitudinally in a middle of the upper surface of the first roof of the 2R1T parallel unit. The four longitudinal upper tracks are divided into two groups, with each group coordinating with one of the two longitudinal lower tracks respectively. An upper surface of each of the longitudinal upper tracks is fixed on a lower surface of the second roof. An upper surface of the longitudinal push-pull board is fixed with the lower surface of the second roof, and a side surface of the longitudinal push-pull board is fixed with an end surface of a push rod of the longitudinal electric cylinder. The longitudinal displacement sensor is installed on the lower surface of the second roof, and is in a same line with the longitudinal electric cylinder. Each of the two first transverse lower tracks is installed transversely on either side of a left region of an upper surface of the second roof. The first transverse electric cylinder is installed in a middle of a left region of the upper surface of the second roof. The four first transverse upper tracks are divided into two groups, with each group coordinating with one of the two first transverse lower tracks respectively, with an upper surface of each of the four first transverse upper tracks being fixed on a lower surface of the first transverse slide. An upper surface of the first transverse push-pull plate is fixed with a lower surface of the first transverse slide, and a side surface of the first transverse push-pull plate is fixed with an end face of a push rod of the first transverse electric cylinder. The first transverse displacement sensor is installed on the lower surface of the first transverse slide, and is on a same line with the first transverse electric cylinder. Two pin holes are arranged along a centerline of the first transverse slide, a first one is situated where the first transverse push-pull plate is installed, and is at a symmetrical position to a second one. On a lower surface of the first limit lower track is arranged a vertical rotary pin that is installed inside the first rotary pin hole. A small end of the first sliding support rod is installed in the second rotational pin hole, and a large end of the first sliding support rod is pressed on a lower surface of the upper platform. Each of the two second transverse lower tracks is installed transversely on either side of a right region of the upper surface of the second roof. The second transverse electric cylinder is installed in a middle of aright region of the upper surface of the second roof, and is symmetric to the first transverse electric cylinder in respect of a geometric center of the second roof. The four second transverse upper tracks are divided into two groups, with each group coordinating with one of the two second transverse lower tracks respectively, and with an upper surface of each of the four second transverse upper tracks being fixed on a lower surface of the second transverse slide. An upper surface of the second transverse push-pull plate is fixed with the lower surface of the second transverse slide, and a side surface of the second transverse push-pull plate is fixed with an end face of a push rod of the second transverse electric cylinder. The second transverse displacement sensor is installed on the lower surface of the second transverse slide, and is on a same line with the second transverse electric cylinder. Two pin holes are arranged along a centerline of the second transverse slide, a first one is situated where the second transverse push-pull plate is installed, and is at a symmetrical position to a second one. On a lower surface of the second limit lower track is arranged a vertical rotary pin that is installed inside the first rotary pinhole. A small end of the first sliding support rod is installed in the second rotational pin hole, and a large end of the second sliding support rod is pressed on the lower surface of the upper platform. The third transverse lower track is installed transversely in a middle of a middle region of the upper surface of the second roof. On an upper surface of the third transverse upper track is arranged a limiter pin, while the limiter pin is installed inside a limiter sleeve of the upper platform. The longitudinal electric cylinder compensates surge motion. The longitudinal displacement sensor collects longitudinal displacement of the second roof due to surge motion. Cooperative motion of the first transverse electric cylinder with the second transverse electric cylinder compensates sway motion and yaw motion. The first transverse displacement sensor and the second transverse displacement sensor collect transverse displacement of the first transverse displacement slide and the second transverse displacement slide due to the sway motion and yaw motion. The first limit lower track and the second limit lower track transmit driving force of the first transverse electric cylinder and the second transverse electric cylinder to the upper platform. The first sliding support rod and the second sliding support rod support the upper platform. The limiter pin on the upper surface of the third transverse upper track restricts motion of the upper platform along the first limit upper track or the second limit upper track.

The upper platform comprises the first limit upper track, the second limit upper track and the limiter sleeve. The first limit upper track, the second limit upper track and the limiter sleeve are all arranged on the lower surface of the upper platform. The first limit upper track and the second limit upper track each cooperates with the first limit lower track and the second limit lower track of the 1R2T series unit respectively. The first limit upper track and the second limit upper track are on a same line which crosses a center of the upper platform. The limiter sleeve is located at the center of the circle of the upper platform and a shaft hole is arranged inside the limiter sleeve to cooperate with the limiter lever of the third transverse upper track of the 1R2T series unit. The upper platform is employed to install on-vessel equipment.

Compared with the prior art, the present invention has the following advantages:

The present invention can compensate the roll, pitch, heave, yaw, sway and surge motion of the ship under the action of sea wave, and has a good compensation effect for the fluctuation caused by superposition of any combination of the six motions.

The present invention reduces dimensionality (three) of the roll, pitch and heave motion in need of compensation of the ship under the action of waves to one for motion in need of compensation of three points fixed on the upper platform in a vertical direction, achieving higher accuracy of pose control and enabling simpler algorithm for pose recognition.

The present invention reduces dimensionality (three) of the yaw, sway and surge motion in need of compensation of the ship under the action of waves to one for motion in need of compensation of two fixed points in two orthogonal directions (two spatial degrees of freedom) in a plane, achieving higher accuracy of pose control and enabling simpler algorithm of pose recognition.

The Reference Numbers for the Drawings are Listed below:

1: soleplate, 2: 2R1T parallel unit, 201: longitudinal hinge, 202: transverse hinge, 203: lower guide rail fitting plate, 204: vertical guide rod, 205: vertical guide sleeve, 206: guide rail fitting roof, 207: first roof, 208: first electric cylinder, 209: second electric cylinder, 210: third electric cylinder, 211: first ball head, 212: second ball head, 213: third ball head, 214: first displacement sensor, 215: second displacement sensor, 216: third displacement sensor, 217: inner stop ring, 218: outer stop ring, 3: a 1R2T series unit, 301: longitudinal lower track, 302: longitudinal electric cylinder, 303: second roof, 304: longitudinal upper track, 305: longitudinal push-pull board, 306: longitudinal displacement sensor, 307: first transverse lower track, 308: first transverse electric cylinder, 309: first transverse upper track, 310: first transverse slide, 311: first transverse push-pull plate, 312: first transverse displacement sensor, 313: first limit lower track, 314: first sliding support rod, 315: second transverse lower track, 316: second transverse electric cylinder, 317: second transverse upper track, 318: second transverse slide, 319: second transverse push-pull plate, 320: second transverse displacement sensor, 321: second limit lower track, 322: second sliding support rod, 323: third transverse lower track, 324: third transverse upper track, 4: upper platform, 401: first limit upper track, 402: second limit upper track, 403: limiter sleeve.

Embodiments

In combination of the drawings hereunder provided, a technical solution for an embodiment of the present invention will be described clearly in details. Obviously, the embodiment provided constitutes only one, but not all of the possible embodiments of the present invention. All the embodiments other the present embodiment obtainable by a person of the art without creative efforts shall fall within the scope of the present invention.

Figure 1:
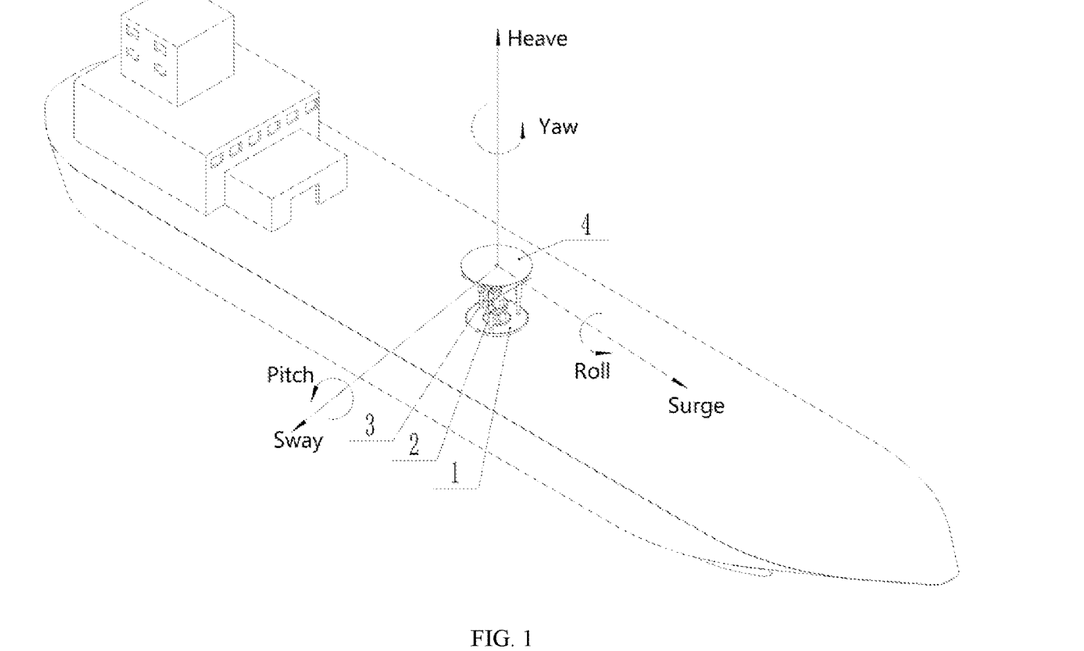
FIG. 1 is a schematic diagram of an on-ship 6-Dof platform for wave compensation of the present invention.
Figure 2:
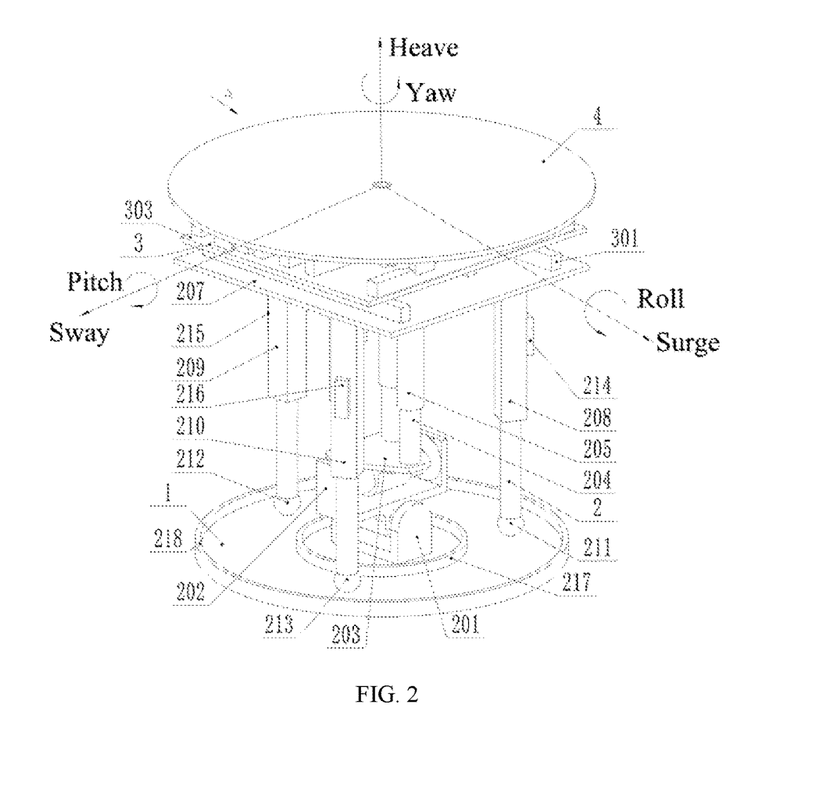
FIG. 2 is a schematic diagram of the 6-Dof platform for wave compensation of the present invention.

In reference to FIGS. 1 to 7, an embodiment of a 6-dof platform for wave compensation is provided as below:

The 6-Dof platform for wave compensation comprises a soleplate 1, a 2R1T parallel unit 2, a 1R2T series unit 3 and an upper platform 4. The soleplate 1 is installed on a deck of the ship, the 2R1T parallel unit 2 is installed on the soleplate 1, the 1R2T series unit 3 is installed on the 2R1T parallel unit 2, and the upper platform 4 is installed on the 1R2T series unit 3.

Figure 3:
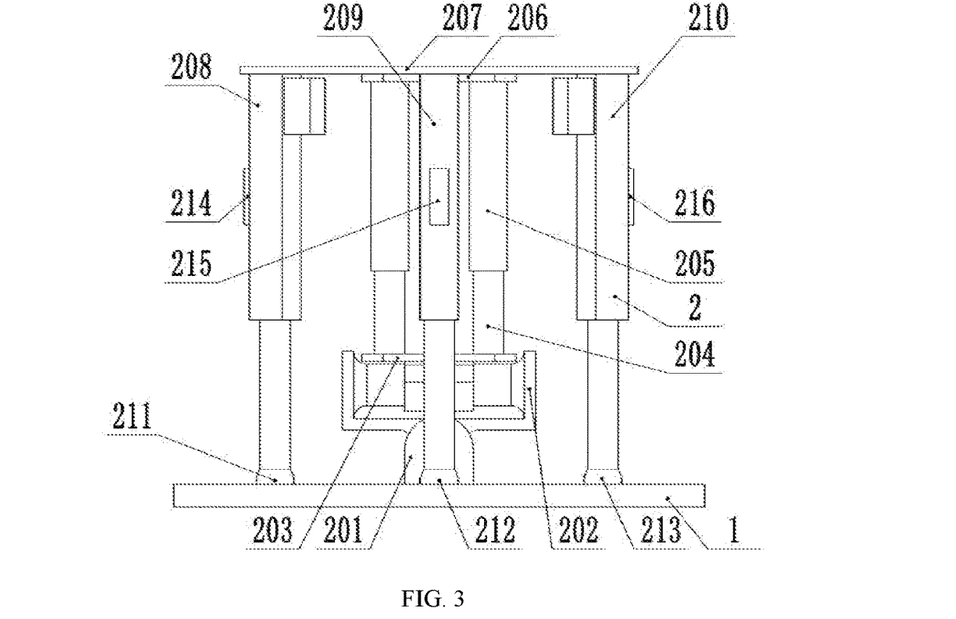
FIG. 3 is a schematic diagram of the rear view (A direction) of the 2R1T parallel unit in FIG. 2 of the present invention.

The 2R1T parallel unit 2 comprises a longitudinal hinge 201, a transverse hinge 202, a lower guide rail fitting plate 203, three vertical guide rods 204, three vertical guide sleeves 205, a guide rail fitting roof 206, a first roof 207, a first electric cylinder 208, a second electric cylinder 209, a third electric cylinder 210, a first ball head 211, a second ball head 212, a third ball head 213, a first displacement sensor 214, a second displacement sensor 215, a third displacement sensor 216, an inner stop ring 217 and an outer stop ring 218. A lower surface of the longitudinal hinge 201 is fixed on the soleplate 1. A side of the transverse hinge 202 is hinged on the longitudinal hinge 201, while another side of the transverse hinge 202 is hinged on the lower guide rail fitting plate 203. The three vertical guide rods 204 are arranged on an upper surface of the lower guide rail fitting plate 203. An end of each of the vertical guide rod 204 is vertically fixed with the lower guide rail fitting plate 203, while another end of each of the vertical guide rod 204 is assembled with one of the vertical guide sleeve 205 respectively. The three vertical guide sleeves 205 are installed on the guide rail fitting roof 206 and fixed vertically with a lower surface of the guide rail fitting roof 206, with an upper surface of the guide rail fitting roof 206 being fixed on a lower surface of the first roof 207. The first electric cylinder 208, the second electric cylinder 209 and the third electric cylinder 210 are all installed on the lower surface of the first roof 207 and a bottom of a cylinder body of each of the first electric cylinder 208, of the second electric cylinder 209 and of the third electric cylinder 210 respectively is vertically fixed with the lower surface of the first roof 207 and an end of a push rod of each of the first electric cylinder 208, of the second electric cylinder 209 and of the third electric cylinder 210 respectively is arranged with the first ball head 211, the second ball head 212 and the third ball head 213 correspondingly. The first ball head 211, the second ball head 212 and the third ball head 213 are all pressed against the soleplate 1. The first displacement sensor 214, the second displacement sensor 215 and the third displacement sensor 216 are all installed on a cylinder body of each of the first electric cylinder 208, of the second electric cylinder 209 and of the third electric cylinder 210 respectively. The inner stop ring 217 and the outer stop ring 218 are both fixed on an upper surface of the soleplate 1. The longitudinal hinge 201 and the transverse hinge 202 constitute a universal hinge unit. The three vertical guide rods 204 limit transverse motion and rotation around vertical direction of the first roof 207. The first displacement sensor 214, the second displacement sensor 215 and the third displacement sensor 216 collect a vertical displacement of the first electric cylinder 208, the second electric cylinder 209 and the third electric cylinder 210 respectively resulting from roll, pitch, and heave motion correspondingly. The inner stop ring 217 and the outer stop ring 218 set a limit of motion range for the first ball head 211, the second ball head 212 and the third ball head 213 in response to compensation of roll and pitch motion respectively via the 2R1T parallel unit 2, ensuring that a compensation stroke of the corresponding electric cylinder is within a specified range.

The 1R2T series unit 3 comprises two longitudinal lower tracks 301, a longitudinal electric cylinder 302, a second roof 303, four longitudinal upper tracks 304, a longitudinal push-pull board 305, a longitudinal displacement sensor 306, two first transverse lower tracks 307, a first transverse electric cylinder 308, four first transverse upper tracks 309, a first transverse slide 310, a first transverse push-pull plate 311, a first transverse displacement sensor 312, a first limit lower track 313, a first sliding support rod 314, two second transverse lower tracks 315, a second transverse electric cylinder 316, four second transverse upper tracks 317, a second transverse slide 318, a second transverse push-pull plate 319, a second transverse displacement sensor 320, a second limit lower track 321, a second sliding support rod 322, a third transverse lower track 323 and a third transverse upper track 324. The two longitudinal lower tracks 301 are longitudinally installed at a left side and a right side respectively of an upper surface of the first roof 207 of the 2R1T parallel unit 2. The longitudinal electric cylinder 302 is installed longitudinally in a middle of the upper surface of the first roof 207 of the 2R1T parallel unit 2. The four longitudinal upper tracks 304 are divided into two groups, with each group coordinating with one of the two longitudinal lower tracks 301 respectively. An upper surface of each of the longitudinal upper tracks is fixed on a lower surface of the second roof 303. An upper surface of the longitudinal push-pull board 305 is fixed with the lower surface of the second roof 303, and a side surface of the longitudinal push-pull board 305 is fixed with an end surface of a push rod of the longitudinal electric cylinder 302. The longitudinal displacement sensor 306 is installed on the lower surface of the second roof 303, and is in a same line with the longitudinal electric cylinder 302. Each of the two first transverse lower tracks 307 is installed transversely on either side of a left region of an upper surface of the second roof 303. The first transverse electric cylinder 308 is installed in a middle of a left region of the upper surface of the second roof 303. The four first transverse upper tracks 309 are divided into two groups, with each group coordinating with one of the two first transverse lower tracks 307 respectively, with an upper surface of each of the four first transverse upper tracks 309 being fixed on a lower surface of the first transverse slide 310. An upper surface of the first transverse push-pull plate 311 is fixed with a lower surface of the first transverse slide 310, and a side surface of the first transverse push-pull plate 311 is fixed with an end face of a push rod of the first transverse electric cylinder 308. The first transverse displacement sensor 312 is installed on the lower surface of the first transverse slide 310, and is on a same line with the first transverse electric cylinder 308. Two pin holes are arranged along a centerline of the first transverse slide 310, a first one is situated where the first transverse push-pull plate 311 is installed, and is at a symmetrical position to a second one. On a lower surface of the first limit lower track 313 is arranged a vertical rotary pin that is installed inside the first rotary pin hole. A small end of the first sliding support rod 314 is installed in the second rotational pin hole, and a large end of the first sliding support rod 314 is pressed on a lower surface of the upper platform 4. Each of the two second transverse lower tracks 315 is installed transversely on either side of a right region of the upper surface of the second roof 303. The second transverse electric cylinder 316 is installed in a middle of a right region of the upper surface of the second roof 303, and is symmetric to the first transverse electric cylinder 308 in respect of a geometric center of the second roof 303. The four second transverse upper tracks 317 are divided into two groups, with each group coordinating with one of the two second transverse lower tracks 315 respectively, and with an upper surface of each of the four second transverse upper tracks 317 being fixed on a lower surface of the second transverse slide 318. An upper surface of the second transverse push-pull plate 319 is fixed with the lower surface of the second transverse slide 318, and a side surface of the second transverse push-pull plate 319 is fixed with an end face of a push rod of the second transverse electric cylinder 316. The second transverse displacement sensor 320 is installed on the lower surface of the second transverse slide 318, and is on a same line with the second transverse electric cylinder 316. Two pin holes are arranged along a centerline of the second transverse slide 318, a first one is situated where the second transverse push-pull plate 319 is installed, and is at a symmetrical position to a second one. On a lower surface of the second limit lower track 321 is arranged a vertical rotary pin that is installed inside the first rotary pin hole. A small end of the first sliding support rod 314 is installed in the second rotational pin hole, and a large end of the second sliding support rod 322 is pressed on the lower surface of the upper platform 4. The third transverse lower track 323 is installed transversely in a middle of a middle region of the upper surface of the second roof 303. On an upper surface of the third transverse upper track 324 is arranged a limiter pin, while the limiter pin is installed inside a limiter sleeve 403 of the upper platform 4. The longitudinal electric cylinder 302 compensates surge motion. The longitudinal displacement sensor 306 collects longitudinal displacement of the second roof 303 due to surge motion. Cooperative motion of the first transverse electric cylinder 308 with the second transverse electric cylinder 316 compensates sway motion and yaw motion. The first transverse displacement sensor 312 and the second transverse displacement sensor 320 collect transverse displacement of the first transverse displacement slide and the second transverse displacement slide due to the sway motion and yaw motion. The first limit lower track 313 and the second limit lower track 321 transmit driving force of the first transverse electric cylinder 308 and the second transverse electric cylinder 316 to the upper platform 4. The first sliding support rod 314 and the second sliding support rod 322 support the upper platform 4. The limiter pin on the upper surface of the third transverse upper track 324 restricts motion of the upper platform 4 along the first limit upper track 401 or the second limit upper track 402.

Figure 4:
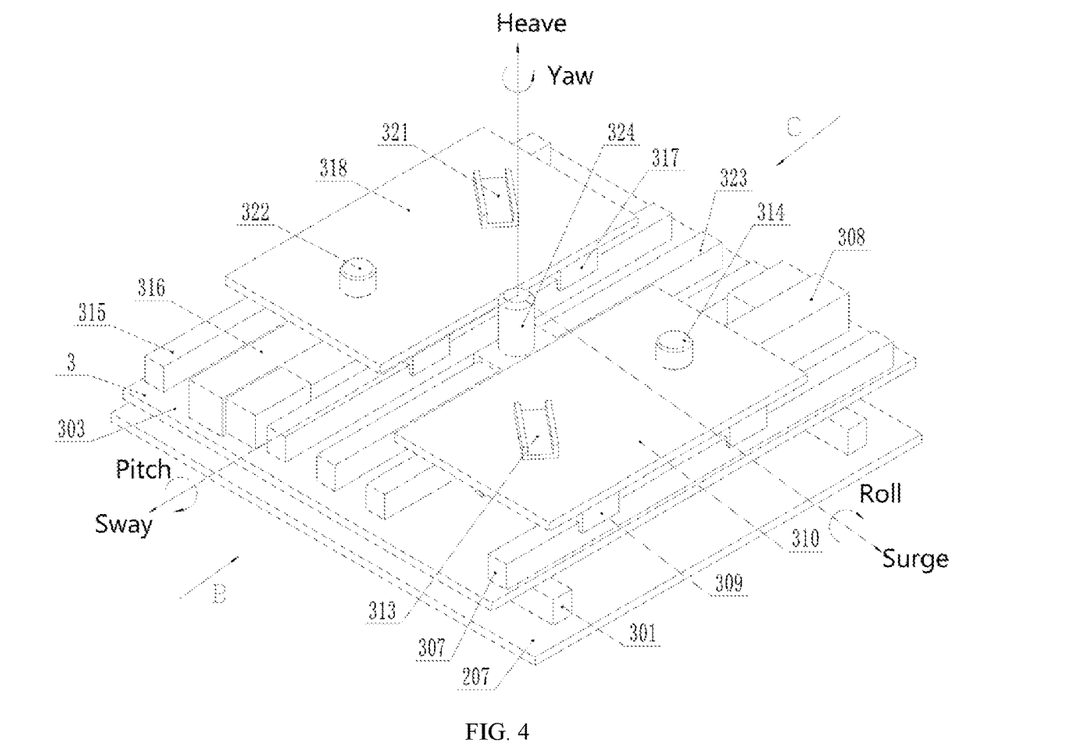
FIG. 4 is a schematic diagram of the axonometric projection of the 1R2T series unit in FIG. 2 of the present invention.
Figure 5:
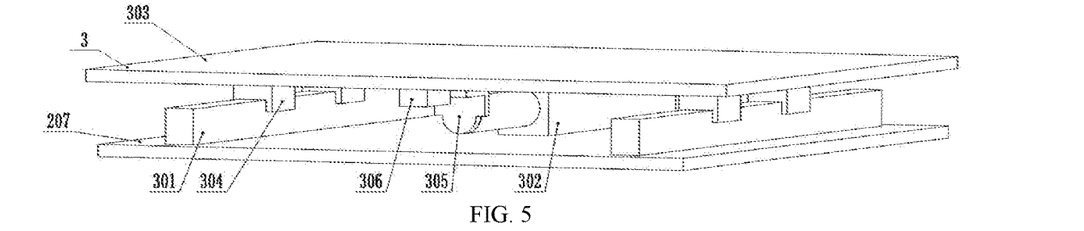
FIG. 5 is a schematic diagram of the axonometric projection of a surge motion compensation unit of the 1R2T series unit in FIG. 4 of the present invention.
Figure 6:
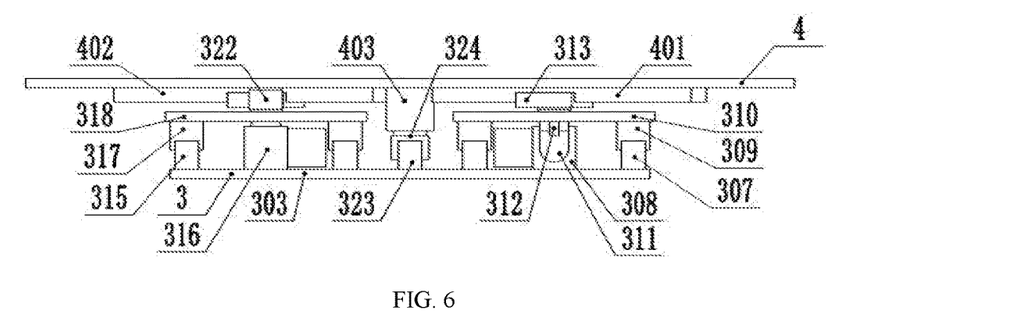
FIG. 6 is a schematic diagram of the left view (B direction) of a sway and yaw motion compensation unit of the 1R2T series unit in FIG. 4 of the present invention.
Figure 7:
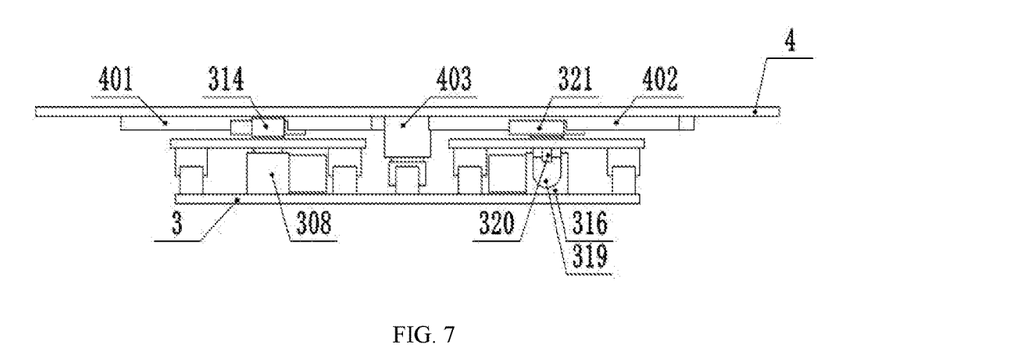
FIG. 7 is a schematic diagram of the right view (C direction) of the sway and yaw motion compensation unit of the 1R2T series unit in FIG. 4 of the present invention.

The upper platform 4 comprises the first limit upper track 401, the second limit upper track 402 and the limiter sleeve 403. The first limit upper track 401, the second limit upper track 402 and the limiter sleeve 403 are all arranged on the lower surface of the upper platform 4. The first limit upper track 401 and the second limit upper track 402 each cooperates with the first limit lower track 313 and the second limit lower track 321 of the 1R2T series unit 3 respectively. The first limit upper track 401 and the second limit upper track 402 are on a same line which crosses a center of the upper platform 4. The limiter sleeve 403 is located at the center of the circle of the upper platform 4 and a shaft hole is arranged inside the limiter sleeve 403 to cooperate with the limiter lever of the third transverse upper track 324 of the 1R2T series unit 3. The upper platform 4 is employed to install on-vessel equipment.

Working Principle:

The compensation unit of the ship for the superposition of the heave, roll and pitch motion under action of sea wave is as follows: any three points in a space determine a plane, thus compensation of the heave, roll and pitch motion under action of sea wave may be regarded as compensation of three points fixed on the upper platform in a vertical direction. Firstly, superposition of the heave, roll and pitch motion under action of sea wave acts on the ship, and the soleplate 1 moves in conjunction with the ship. The heave, roll and pitch motions of soleplate 1 drives the vertical motion of the first electric cylinder 208, the second electric cylinder 209 and the third electric cylinder 210 respectively via the first ball head 211, the second ball head 212 and the third ball head 213 respectively. The displacements in vertical direction of the first electric cylinder 208, of the second electric cylinder 209 and of the third electric cylinder 210 are detected via the first displacement sensor 214, the second displacement sensor 215 and the third displacement sensor 216 respectively, and the data obtained therefrom are inputted into the controller, which in turn controls the displacements of the first electric cylinder 208, of the second electric cylinder 209 and of the third electric cylinder 210 for reverse compensation in the vertical direction.

The compensation unit of the ship for the superposition of the yaw, sway and surge motion under action of sea wave is as follows: the plane for the three degrees of freedom of yaw, sway and surge motion is determined by two points fixed in the plane, thus compensation of the yaw, sway and surge motion under action of sea wave may be regarded as compensation of two fixed points in two orthogonal directions in the plane. The surge motion of the soleplate 1 is transmitted via the longitudinal hinge 201 to the transverse hinge 202. The lower guide rail fitting plate 203 moves in conjunction with the transverse hinge 202, while the vertical guide rod 204 moves in conjunction with the lower guide rail fitting plate 203. The vertical guide rod 204 transfers the motion thereof to the vertical guide sleeve 205. The guide rail fitting roof 206 moves in conjunction with the vertical guide sleeve 205, the first roof 207 moves in conjunction with the guide rail fitting roof 206, and the longitudinal electric cylinder 302 moves in conjunction with the first roof 207. The longitudinal electric cylinder 302 drives the second roof 303 to move along the longitudinal direction. The longitudinal displacement sensor 306 detects the longitudinal displacement of the second roof 303 and inputs the data obtained therefrom into the controller, which in turn controls the displacement of the longitudinal electric cylinder 302 for reverse compensation in the longitudinal direction. The sway and yaw motions of the soleplate 1 are transmitted via the longitudinal hinge 201 to the transverse hinge 202. The lower guide rail fitting plate 203 moves in conjunction with the transverse hinge 202, and the vertical guide rod 204 moves in conjunction with the lower guide rail fitting plate 203. The vertical guide rod 204 transmits the motion thereof to the vertical guide sleeve 205. The guide rail fitting roof 206 moves in conjunction with vertical guide sleeve 205, the first roof 207 moves in conjunction with the guide rail fitting roof 206, and the longitudinal lower track 301 moves in conjunction with the first roof 207. The longitudinal lower track 301 drives the longitudinal upper track 304 to move along the sway and yaw degrees of freedom. The second roof 303 moves in conjunction with the longitudinal upper track 304, and the first transverse electric cylinder 308 and the second transverse electric cylinder 316 move in conjunction with the second roof 303. The first transverse electric cylinder 308 and the second transverse electric cylinder 316 respectively drives the first transverse slide 310 and the second transverse slide 318 along the transverse direction. The first transverse displacement sensor 312 and the second transverse displacement sensor 320 respectively detects the transverse displacement of the first transverse slide 310 and the second transverse slide 318, and inputs the data obtained therefrom into the controller, which in turn controls the displacement of the first transverse electric cylinder 308 and of the second transverse electric cylinder 316 for reverse compensation in the transverse direction.

The compensation units of the ship for the superposition of the heave, roll, pitch, yaw, sway and surge motion under action of sea wave is as follows: superposition of the heave, roll and pitch motion on the ship under action of sea wave results in change of the plane position of the upper platform 4, while superposition of the yaw, sway and surge motion on the ship results in change of position and orientation of the upper platform 4 in respect of a specific plane in the space. Thus, the 2R1T parallel unit 2 first compensates the upper platform 4 onto a horizontal plane, then the 1R2T series unit compensates the upper platform 4 onto its original position.

Compared with the Prior Art, the Present Invention has the Following Advantages:

The present invention can compensate the roll, pitch, heave, yaw, sway and surge motion of the ship under action of sea wave, and has a good compensation effect for the fluctuation caused by superposition of any combination of the six motions.

The present invention reduces dimensionality (three) of the roll, pitch and heave motion in need of compensation of the ship under the action of waves to one for motion in need of compensation of three points fixed on the upper platform in a vertical direction, achieving higher accuracy of pose control and enabling simpler algorithm for pose recognition.

The present invention reduces dimensionality (three) of the yaw, sway and surge motion in need of compensation of the ship under the action of waves to one for motion in need of compensation of two fixed points in two orthogonal directions (two spatial degrees of freedom) in a plane, achieving higher accuracy of pose control and enabling simpler algorithm of pose recognition.

The present invention has so far been exemplified with the foregoing embodiment. Technical solution for the aforementioned embodiment may be modified by a person of the art, or technical characteristics thereof may be substituted, without departure from the spirit and principle of the present invention, all of the modification, substitution, and improvement shall fall within the scope of the present invention.

We claim:

1. A 6-Dof platform for wave compensation, comprising a soleplate (1), a 2R1T parallel unit (2), a 1R2T series unit (3) and an upper platform (4); wherein the soleplate (1) is installed on a deck of a ship, the 2R1T parallel unit (2) is installed on the soleplate (1), the 1R2T series unit (3) is installed on the 2R1T parallel unit (2), and the upper platform (4) is installed on the 1R2T series unit (3);

the 2R1T parallel unit (2) comprises a longitudinal hinge (201), a transverse hinge (202), a lower guide rail fitting plate (203), three vertical guide rods (204), three vertical guide sleeves (205), a guide rail fitting roof (206), a first roof (207), a first electric cylinder (208), a second electric cylinder (209), a third electric cylinder (210), a first ball head (211), a second ball head (212), a third ball head (213), a first displacement sensor (214), a second displacement sensor (215), a third displacement sensor (216), an inner stop ring (217) and an outer stop ring (218); a lower surface of the longitudinal hinge (201) is fixed on the soleplate (1); a side of the transverse hinge (202) is hinged on the longitudinal hinge (201), another side of the transverse hinge (202) is hinged on the lower guide rail fitting plate (203); the three vertical guide rods (204) are arranged evenly on an upper surface of the lower guide rail fitting plate (203); an end of each of the vertical guide rods (204) is vertically fixed with the lower guide rail fitting plate (203), another end of each of the vertical guide rods (204) is assembled with one of the vertical guide sleeves (205) respectively; the three vertical guide sleeves (205) are installed on the guide rail fitting roof (206) and fixed vertically with a lower surface of the guide rail fitting roof (206), with an upper surface of the guide rail fitting roof (206) being fixed on a lower surface of the first roof (207); the first electric cylinder (208), the second electric cylinder (209) and the third electric cylinder (210) are all installed on the lower surface of the first roof (207) and a bottom of a cylinder body of each of the first electric cylinder (208), of the second electric cylinder (209) and of the third electric cylinder (210) respectively is vertically fixed with the lower surface of the first roof (207) and an end of a push rod of each of the first electric cylinder (208), of the second electric cylinder (209) and of the third electric cylinder (210) respectively is arranged with the first ball head (211), the second ball head (212) and the third ball head (213) correspondingly; the first ball head (211), the second ball head (212) and the third ball head (213) are all pressed against the soleplate (1); the first displacement sensor (214), the second displacement sensor (215) and the third displacement sensor (216) are installed on a cylinder body of each of the first electric cylinder (208), of the second electric cylinder (209) and of the third electric cylinder (210) respectively; the inner stop ring (217) and the outer stop ring (218) are both fixed on an upper surface of the soleplate (1); the longitudinal hinge (201) and the transverse hinge (202) constituting a universal hinge unit; the three vertical guide rods (204) restraining transverse movement and rotation around vertical direction of the first roof (207); the first displacement sensor (214), the second displacement sensor (215) and the third displacement sensor (216) collecting a vertical displacement of the first electric cylinder (208), of the second electric cylinder (209) and of the third electric cylinder (210) respectively resulting from movement of roll, pitch, and heave correspondingly; the inner stop ring (217) and the outer stop ring (218) setting a limit of motion range for the first ball head (211), the second ball head (212) and the third ball head (213) in response to compensation of movement of roll and pitch respectively via the 2R1T parallel unit (2), ensuring that a compensation stroke of the corresponding electric cylinder is within a specified range;

the 1R2T series unit (3) comprises two longitudinal lower tracks (301), a longitudinal electric cylinder (302), a second roof (303), four longitudinal upper tracks (304), a longitudinal push-pull board (305), a longitudinal displacement sensor (306), two first transverse lower tracks (307), a first transverse electric cylinder (308), four first transverse upper tracks (309), a first transverse slide (310), a first transverse push-pull plate (311), a first transverse displacement sensor (312), a first limit lower track (313), a first sliding support rod (314), two second transverse lower tracks (315), a second transverse electric cylinder (316), four second transverse upper tracks (317), a second transverse slide (318), a second transverse push-pull plate (319), a second transverse displacement sensor (320), a second limit lower track (321), a second sliding support rod (322), a third transverse lower track (323) and a third transverse upper track (324); the two longitudinal lower tracks (301) are longitudinally installed at a left side and a right side respectively of an upper surface of the first roof (207) of the 2R1T parallel unit (2); the longitudinal electric cylinder (302) is installed longitudinally in a middle of the upper surface of the first roof (207) of the 2R1T parallel unit (2); the four longitudinal upper tracks (304) are divided into two groups, with each group coordinating with one of the two longitudinal lower tracks (301) respectively; an upper surface of each of the longitudinal upper tracks (304) is fixed on a lower surface of the second roof (303); an upper surface of the longitudinal push-pull board (305) is fixed with the lower surface of the second roof (303), and a side surface of the longitudinal push-pull board (305) is fixed with an end surface of a push rod of the longitudinal electric cylinder (302); the longitudinal displacement sensor (306) is installed on the lower surface of the second roof (303), and is in a same line with the longitudinal electric cylinder (302); each of the two first transverse lower tracks (307) is installed transversely on either side of a left region of an upper surface of the second roof (303); the first transverse electric cylinder (308) is installed in a middle of a left region of the upper surface of the second roof (303); the four first transverse upper tracks (309) are divided into two groups, with each group coordinating with one of the two first transverse lower tracks (307) respectively, with an upper surface of each of the four first transverse upper tracks (309) being fixed on a lower surface of the first transverse slide (310); an upper surface of the first transverse push-pull plate (311) is fixed with a lower surface of the first transverse slide (310), and a side surface of the first transverse push-pull plate (311) is fixed with an end face of a push rod of the first transverse electric cylinder (308); the first transverse displacement sensor (312) is installed on the lower surface of the first transverse slide (310), and is on a same line with the first transverse electric cylinder (308); two pin holes are arranged along a centerline of the first transverse slide (310), a first one is situated where the first transverse push-pull plate (311) is installed, and is at a symmetrical position to a second one; on a lower surface of the first limit lower track (313) is arranged with a vertical rotary pin that is installed inside the first rotary pin hole; a small end of the first sliding support rod (314) is installed in the second rotational pin hole, and a large end of the first sliding support rod (314) is pressed on a lower surface of the upper platform (4); each of the two second transverse lower tracks (315) is installed transversely on either side of a right region of the upper surface of the second roof (303); the second transverse electric cylinder (316) is installed in a middle of a right region of the upper surface of the second roof (303), and is symmetric to the first transverse electric cylinder (308) in respect of a geometric center of the second roof (303); the four second transverse upper tracks (317) are divided into two groups, with each group coordinating with one of the two second transverse lower tracks (315) respectively, and with an upper surface of each of the four second transverse upper tracks (317) being fixed on a lower surface of the second transverse slide (318); an upper surface of the second transverse push-pull plate (319) is fixed with the lower surface of the second transverse slide (318), and a side surface of the second transverse push-pull plate (319) is fixed with an end face of a push rod of the second transverse electric cylinder (316); the second transverse displacement sensor (320) is installed on the lower surface of the second transverse slide (318), and is on a same line with the second transverse electric cylinder (316); two pin holes are arranged along a centerline of the second transverse slide (318), a first one is situated where the second transverse push-pull plate (319) is installed, and is at a symmetrical position to a second one; on a lower surface of the second limit lower track (321) is arranged a vertical rotary pin that is installed inside the first rotary pin hole; a small end of the second sliding support rod (322) is installed in the second rotational pin hole, and a large end of the second sliding support rod (322) is pressed on the lower surface of the upper platform (4); the third transverse lower track (323) is installed transversely in a middle of a middle region of the upper surface of the second roof (303); on an upper surface of the third transverse upper track (324) is arranged a limiter pin, while the limiter pin is installed inside a limiter sleeve (403) of the upper platform (4); the longitudinal electric cylinder (302) compensates surge motion; the longitudinal displacement sensor (306) collects longitudinal displacement of the second roof (303) due to surge motion; cooperative motion of the first transverse electric cylinder (308) with the second transverse electric cylinder (316) compensates sway motion and yaw motion; the first transverse displacement sensor (312) and the second transverse displacement sensor (320) collect transverse displacement of the first transverse displacement slide (310) and the second transverse displacement slide (318) due to the sway motion and yaw motion; the first limit lower track (313) and the second limit lower track (321) transmit driving force of the first transverse electric cylinder (308) and the second transverse electric cylinder (316) to the upper platform (4); the first sliding support rod (314) and the second sliding support rod (322) support the upper platform (4); the limiter pin on the upper surface of the third transverse upper track (324) restricts motion of the upper platform (4) along a first limit upper track (401) or a second limit upper track (402);

the upper platform (4) comprises the first limit upper track (401), the second limit upper track (402) and the limiter sleeve (403); the first limit upper track (401), the second limit upper track (402) and the limiter sleeve (403) are all arranged on the lower surface of the upper platform (4); the first limit upper track (401) and the second limit upper track (402) each cooperates with the first limit lower track (313) and the second limit lower track (321) of the 1R2T series unit (3) respectively; the first limit upper track (401) and the second limit upper track (402) are on a same line which crosses a center of a circle of the upper platform (4); the limiter sleeve (403) is located at the center of the circle of the upper platform (4) and a shaft hole is arranged inside the limiter sleeve (403) to cooperate with the limiter lever of the third transverse upper track (324) of the 1R2T series unit (3).

\* \* \* \* \*